(12) United States Patent
Blount

(10) Patent No.: US 8,409,403 B2
(45) Date of Patent: Apr. 2, 2013

(54) PRODUCTION OF AMINO LIGNIN AND AMINO LIGNIN CELLULOSE RESINS AND ADHESIVES

(76) Inventor: David H. Blount, San Diego, CA (US)

( * ) Notice: Subject to any disclaimer, the term of this patent is extended or adjusted under 35 U.S.C. 154(b) by 492 days.

(21) Appl. No.: 12/658,429

(22) Filed: Feb. 12, 2010

(65) Prior Publication Data
US 2011/0098384 A1 Apr. 28, 2011

Related U.S. Application Data

(63) Continuation-in-part of application No. 12/589,399, filed on Oct. 23, 2009, now Pat. No. 8,268,121.

(51) Int. Cl.
*D21C 3/20* (2006.01)
*C08H 7/00* (2011.01)

(52) U.S. Cl. .......................................... 162/72; 527/400
(58) Field of Classification Search ............. 162/72; 156/336, 400; 530/501
See application file for complete search history.

(56) References Cited

U.S. PATENT DOCUMENTS

| | | | | |
|---|---|---|---|---|
| 2,037,001 A | * | 4/1936 | Aronovsky | 162/14 |
| 3,097,177 A | * | 7/1963 | Waldo | 524/499 |
| 7,029,553 B1 | * | 4/2006 | Williams et al. | 162/29 |

FOREIGN PATENT DOCUMENTS
GB 2086955 A * 5/1982

OTHER PUBLICATIONS

Li et al., Characterization of extracted lignin of Bamboo pretreated with sodium hydroxide/urea solution at low temperature, 201 O, BioResources, 5(3), 1762-1778.*
Bajpai et al., Use of Urea as an Additive in Kraft Pulping of Eucalyptus, Aug. 2008, TAPPI Engineering, Pulping and Environmental Conference, p. 1-8.*

* cited by examiner

*Primary Examiner* — Anthony Calandra

(57) ABSTRACT

Flame retardant and water resistant products are produced from bio-based materials such as lignin cellulose containing materials. The lignin cellulose materials are modified by the method of delignification. The method of this invention utilizes an amino compound in an aqueous solution to react with the lignin in the lignin cellulose and the amino lignin and freed lignin becomes water soluble. The amino compound also reacts with the non-water soluble lignin still attached to the cellulose and also to the cellulose that is produced. Other products are produced in this method such as carbohydrates, hemi-cellulose, rosins, waxes, alcohols and other products. The amino lignin, lignin, amino lignin and amino cellulose is reacted with many organic and inorganic compounds such as aldehydes, polyisocyanates, epoxies, polycarboxylic acids, vegetable oils and many other compounds to produce resins and adhesives which may be used to produce products such as molded products, particleboard, plywood, ABS, etc. which are flame retardant and water resistant.

16 Claims, No Drawings

PRODUCTION OF AMINO LIGNIN AND AMINO LIGNIN CELLULOSE RESINS AND ADHESIVES

This application is a continuation in part of application Ser. No. 12/589,399, filed Oct. 23, 2009, now U.S. Pat. No. 8,268,121.

TECHNICAL FIELD

The invention concerns urea and other amino compounds utilized in an aqueous solution to break the lignin cellulose bond and react the amino compound with the lignin and with the lignin attached to the cellulose to produce amino lignin, amino cellulose, lignin and amino lignin cellulose along with other products such as carbohydrates, hemi-cellulose, waxes, rosins, alcohols, agar and other products. The aqueous solution containing amino lignin, lignin, carbohydrates, hemi-cellulose and other compounds are separated from the amino lignin cellulose, amino cellulose and lignin cellulose by filtration. The amino lignin and the other water soluble compounds in the aqueous solution may be recovered by evaporating off the water. The amino lignin and lignin are dark brown in color and are thermoplastic compound which will react with many compounds to produce compounds, adhesives and resinous materials. This invention relates to a novel and economical process to break the lignin cellulose bond and react the lignin with the amino delignification compounds then react the amino lignin, amino cellulose and amino lignin cellulose with organic and inorganic compounds. The amino compounds also reacts with some of the lignin still attached to the lignin cellulose and also in this process some lignin, chemically active lignin cellulose, carbohydrates and other products are produced.

BACKGROUND

The use of amino compounds reacted with aldehydes is well know in the Art to produce aminoplasts for use as an adhesive and resins but the aminoplasts will not produce delignification of the lignin from lignin cellulose plants. The novel process of this invention to produce delignification of lignin cellulose plants and produce amino lignin, amino cellulose and amino lignin cellulose, hemi-cellulose, carbohydrates and other products by the use of amino compounds in an aqueous solution as the delignification compounds is novel. Urea, guanidine compounds or combination urea and other amino compounds when heated in an aqueous solution containing particles of lignin cellulose it produces a delignification of the lignin from the lignin cellulose by the urea reacts with lignin and with some of the amino compound is reacted with the lignin attached to the lignin cellulose to produce amino lignin cellulose and amino cellulose. There is also some hemi-cellulose, carbohydrates, rosin and other compounds found in the aqueous solution containing the lignin and amino lignin. The amino salt of lignin is produced by the novel method of mixing an amino compound, preferable urea and/or guanidine compounds, in water with particles of lignin cellulose plants which is then soaked at ambient temperature and pressure for 12 to 24 hours or heated at ambient or elevated pressure at 100 degree C. to 150 degree C. for 0.5 to 4 hours or longer thereby reacting the amino compound with lignin and breaking the lignin cellulose bond and the amino compound reacts with cellulose and the lignin that is still attached to the cellulose to produce amino cellulose and amino lignin cellulose. The amino lignin, carbohydrates, hemi-cellulose, lignin and other compounds are soluble in water and is separated from the amino salt of lignin cellulose, amino cellulose and lignin cellulose by filtration. The carbohydrates may be separated from the water soluble amino lignin and lignin by using an organic solvent in which the amino lignin is soluble and the carbohydrates are not.

There are many patents and articles related to the use of urea formaldehyde combined with lignin sulfate and Kraft lignin but the urea is not utilized for delignification as in this invention. Some patents such a U.S. Pat. Nos. 2,366,265, 2,622,979 and 3,994,860 use lignin sulfonate as an additive to aminoplast and phenoplasts. I have not found any article or patents that utilize amino compounds for delignification and react an amino compound to produce amino lignin in the process of delignification. When urea is reacted with the know types of lignin such as lignin sulfonate, Kraft lignin (alkali process) a completely different salt of lignin is formed such as urea salt of lignin sulfonate. The Kraft lignin has to be modified in order for it to be chemically active.

SUMMARY

In one aspect, the invention comprises the delignification of biomass consisting of lignin containing plants by an amino compound such as urea and/or guanidine compounds in an aqueous solution by the process of the amino compound reacting with the lignin in lignin containing plants and the amino lignin compounds become water soluble and the amino compound react with some of the lignin still attached to the cellulose and cellulose which is not water soluble. In this delignification process there are other compounds which become water soluble or separates from the lignin cellulose such as carbohydrates such as glucose, alcohols, rosins, waxes, gums, oils, agar, turpentine, resins, rubber latex, dyes, hemi-cellulose, etc.

In another aspect, the invention comprises the evaporation of the water from the aqueous solution produced by the delignification of the lignin cellulose to recover the amino lignin, lignin, carbohydrates, sugars, hemi-cellulose and other products in the aqueous solution. The carbohydrates and the other compounds which are not soluble in certain organic solvents such as some alcohols, acetones, ketones, etc., are separated from the amino lignin, lignin and other compounds which are soluble in certain organic solvents. The carbohydrates are useful to produce alcohol, as cattle feed, etc.

In another aspect, the invention comprises the reaction of the amino lignin, amino cellulose and amino lignin cellulose together with organic compound or inorganic compounds to produce adhesive and resins to use in the production of particleboard, plywood, OSB and other wood products.

In another aspect, the invention comprises the reaction of water soluble amino lignin with organic compounds and/or inorganic compounds to produce adhesive and resins to use in the production of particleboard, plywood, wood molded products, glued wood product, etc.

In another aspect, the invention comprises the reaction of the non-water soluble amino lignin cellulose and amino cellulose with organic compounds and inorganic compounds to produce adhesive, resins and to break down the amino lignin cellulose, amino cellulose and lignin cellulose by mineral acids, by enzymes or bacteria into carbohydrates to be used for the production of alcohol by means of fermentation using yeast or other methods.

In another aspect, the invention comprises adding the amino lignin resins to lignin cellulose plants such as sawdust and compress and cure the resin by heat and/or catalyst.

The object of this invention is to utilize lignin containing plant for delignification of the lignin containing plants by reacting with an amino compound to produce amino lignin, amino cellulose and amino lignin cellulose then react them with an organic or inorganic compound to produce adhesives and resins and recover the carbohydrates and other products found in lignin cellulose plants.

The object of the present invention is to provide a novel process to produce amino lignin, amino cellulose, amino lignin cellulose resinous products, carbohydrates, alcohol, rosin, waxes, hemi-cellulose, gums, agar, turpentine, resins, rubber latex, dyes, etc., from cellulose-containing plants. Another object is to produce novel amino lignin, amino lignin-cellulose and amino cellulose resinous products which are highly reactive. Still another object is to produce carbohydrates which can be fermented to produce ethanol. Another object is to produce novel poly(furfuryl alcohol amino lignin), poly(furfuryl alcohol amino cellulose) and poly(furfuryl alcohol amino lignin cellulose)) resinous products. Still another object is to produce amino lignin, amino cellulose and amino lignin cellulose resinous product which will react chemically with aldehydes to produce novel poly(aldehyde amino lignin cellulose), poly(aldehyde amino lignin) and poly(aldehyde amino cellulose) resinous products and foams. Another object is to produce amino lignin, amino cellulose and amino lignin cellulose polymers that will react with aldehyde compounds and phenol compounds to produce novel poly(phenoplast amino lignin), poly(phenoplast amino cellulose) and poly(phenoplast amino lignin cellulose) resins and foams. Another object is to produce lignin cellulose polymers and amino lignin cellulose that will react with polyisocyanate compounds and polyurethane prepolymers to produce novel poly(polyisocyanate amino lignin cellulose), poly(polyisocyanate amino cellulose) and poly(urethane amino lignin-cellulose) resins and cellular products. Another object is to produce amino lignin, amino cellulose and amino lignin cellulose polymers that will react with polyurethane prepolymers and oxidated silicon compounds to produce novel poly (urethane amino ligninsilicate), poly(urethane amino cellulose silicate) and poly(urethane amino lignin cellulose silicate) resins and cellular solid products.

Component A

Suitable cellulose-containing plants include, but are not limited to, trees, e.g., spruce, pine, hemlock, fir, oak, ash, larch, birch, aspen, poplar, cedar, beech, maple, walnut, cypress, redwood, cherry, elm, chestnut, hickory, locust, sycamore, tulip, tupelo, butternut, apple, alder, magnolia, dogwood, catalpa, boxwood, crabwood, mahogany, greenheart, lancewood, letterwood, mora, prima vera, purpleheart, rose.-wood, teak, satinwood, mangrove, wattle, orange, lemon, logwood, fustic, osage orange, sappanwood, Brazilwood, barwood, camwood, sandalwood, rubber, gutta, mesquite, and shrubs, e.g., oleander, cypress, junipers, acanthus, pyracantha, ligustrum, la tana, bougainvillea, azalea, feijoa, ilex, fuscia, hibiscus, datura, holly, hydrangea, jasmine, eucalyptus, cottoneaster, xylosma, rhodeodendron, castor bean, eugenia, euonymus, fatshedera, aralia, etc., and agricultural plants, e.g., cotton, cotton stalks, corn stalks, corn cobs, wheat straw, oat straw, rice straw, cane sugar (bagasse), soybean stalks, peanut plants, pea vines, sugar beet waste, sorghum stalks" tobacco stalks, maize stalks, barley straw, buckwheat straw, quinoa stalks, cassaya, potato plants, legume vines and stalks, vegetable inedible portion, etc., weeds, grasses, vines, kelp, flowers and algae. Wood fibers are the preferred lignin cellulose containing materials. The waste products of agricultural plants which contain cellulose may be air-dried, then ground into small particles and used in this invention. Commercial waste products containing cellulose, e.g., paper, cotton cloth, bagasse wallboard, wood products, etc., may be used in this invention. Lignin cellulose-containing plants which have been partially decomposed, such as humus, peat and certain soft brown coal, may be used in this invention. Other products of lignin cellulose containing plants may be recovered in the process of this invention such as waxes, gums, oils, sugars, wood alcohol, agar, rosin, turpentine, resins, rubber latex, dyes, etc. The lignin cellulose is utilized in the amount of 50 to 100 parts by weight preferable in small particles such as sawdust.

Component B

Any suitable amino compound may be used in this invention such as urea, thiourea, alkyl-substituted thiourea, alkyl-substituted ureas, melamine, aniline, guanidine, aminoguanidine, melamine cyanurate, biuret, cyanuric acid, sccharin, urea condensates such as urea-cyandiamide, urea-aminoguanidine condensate, urea guanidine condensate, urea polyamine condensate, cyamelide, urea-melamine condensate, urea-dicyandiamide, urea cyanoguanidine condensate, urea cyanate condensates and aminophosphates with free $NH_2$, sulfon-amides, toluene sulfonamide, aliphatic and aromatic polyamines and mixtures thereof. Urea and guanidines are the preferred amino compounds for delignification of the lignin cellulose but may be utilized with other amino compounds. The amino compounds are utilized in the amount of 10-100 parts by weight when used as a delignification compound or as compound to react with the delignification compounds of lignin cellulose. Urea is the preferred amino compound.

Component C

Water is utilized in the delignification process and may be utilized in the amount of 1 to 500 parts by weight.

Component D

Any suitable inorganic or organic compound in the amount of 25 to 100 parts by weight that will react with the amino lignin, amino cellulose, amino lignin cellulose, lignin, lignin cellulose, cellulose or carbohydrates may be utilized in this invention. Suitable reactive compounds include but not limited to the following compounds:

Any suitable salt forming compound may be used in this invention. Any suitable alkali compound may be used in this invention. Alkali metal compounds are preferred such as alkali metal oxides, alkali metal hydroxide, alkali metal silicates and mixtures thereof. Mixtures of sodium hydroxide and calcium hydroxide may be used. Suitable alkali metal hydroxides include sodium hydroxide, potassium hydroxide and mixtures thereof. Sodium hydroxide is the preferred alkali compound.

Any suitable acidic salt forming compound may be used. Suitable acidic salt forming compounds include mineral acids, organic acid, organic acid halides, hydrogen containing acid salts, e.g., sodium hydrogen sui ate, potassium hydrogen sulfate, sodium dihydrogen phosphate, ammonium sulfate, ammonia polyphosphate, urea phosphate, melamine phosphate and mixtures thereof. Mineral acids are preferred especially sulfuric acid and hydrochloric acid.

Any suitable aldehyde may be used in this invention, such as formaldehyde, acetaldehyde, butyl aldehyde, chloral, acrolein, furfural, benzaldehyde, crotonaldehyde, propionaldehyde, pentanals, hexanals, heptanals, octanals and there simple substitution products, semi-acetate and full acetals, paraformaldehyde and mixtures thereof. Compounds containing active aldehyde groups such as hexamethylenetetramine may be used.

Any suitable phenol compound may be used in this invention such as phenol, p-cresol, o-cresol, m-cresol, cresylic acid, xylenols, resorcinol, cashew nut shell liquids, anacordol, p-tert-butyl phenol, Bisphenol A, creosote oil, 2,6 dimethylphenol and mixtures thereof. Phenol is the preferred phenol compound and formaldehyde is the preferred aldehyde when used with a phenol compound. Any suitable thermosetting phenol-formaldehyde and urea-formaldehyde resins may be used in this invention. Any suitable mixture of the amino compounds and phenol compounds with an aldehyde may be used in this invention.

Any suitable bio based compounds may be use in this invention suitable bio based compounds include but not limited to vegetable oils such as soy bean oil, cottonseed oil, safflower oil, peanut oil, sun flower oil, peanut oil, canola oil, corn oil, palm oil, rapeseed oil, and mixtures thereof, soy protein, soy milk, lignin, sodium lignin sulfonate, sodium cellulose, hemi-cellulose, sugar, corn syrup, molasses and mixtures thereof. Any oil-containing seeds nuts and kernels in which the oil can be removed and produces suitable oil that can be used in this invention may be obtained from apricot stones, avocado, bilibary, borage, stinging nettle, beach nuts, copra, cashew nut, calendula, groundnut, spurge, rubber seed, rose hip, hemp, hazelnut, raspberry, elderberry, black currant, coffee, coriander, linseed, caraway seed macadamia nut, almonds, melon seed, poppy, nutmeg, evening primrose, neem seed, niger seed, red pepper, brazil nut, passion fruit, pecan, pistachio, sea buckhorn, mustard seed, sesame seed, tropho plant, tomato seed, grape seed, flax seed, walnut and citrus seed. Vegetable fats and proteins may also be used. Soy bean oil and modified soy oil are preferred.

Any suitable acid compound, inorganic or organic, may be used, and as an acid catalyst, including those which also have a chain building function such as sulphurous acid, sulphuric acid, hypophosphorous acid, phosphinic acids, phosphonous acids and phosphonic acid, glycolic acid, lactic acid, succinic acid, tartaric acid, oxalic acid, phthalic acid, trimellitic acid and the like. Further examples of acids may be found in German Patent No. 1,178,586 and in U.S. Pat. No. 3,480,592. Acids such as hydrochloric, fluoroboric acid, amido-sulphonic acid, phosphoric acid and its derivatives, acetic acid, propionic acid, etc., may be used. Inorganic hydrogen-containing salts may be used such as sodium hydrogen sulphate, potassium hydrogen sulphate, sodium dihydrogen phosphate, potassium dihydrogen phosphate and mixtures thereof. The acid compounds may be used to react with the alkali metal atoms in the lignin cellulose-containing plant polymer to produce a salt. The acid compounds may also be used as a catalyst in the reactions to produce poly(aminoplast amino lignin cellulose) and poly(aminoplast amino lignin) resinous products, and foam poly(phenoplast amino lignin cellulose) resinous products and foam and poly(aminoplast amino lignin cellulose phenoplast) resinous and foamed products.

Any suitable oxidated silicon compound may be used in this invention such as silica, e.g., hydrated silica, silicoformic acid, silica sol, etc., alkali metal silicates, alkaline earth metal silicates, natural Silicates with free silicic acid groups and mixtures thereof. The hydrated silica includes various silicon acids such as silicic acid gel, ortho-silicic acid, elasilicic acid, monosilandiol, polysilicoformic acid, etc. Hydrated silica is the preferred oxidated silicon compound.

Any suitable organic polyisocyanate may be used according to the invention, including aliphatic, cycioaliphatic, araliphatic, aromatic and heterocyclic polyisocyanates. Suitable polyisocyanates, for example, arylene polyisocyanates such as tolylene, metaphenylene; 4-chlorophenylene-1,3-; methylene-bis-(phenylene-4-); biphenylene-4,4'-; 3,3-dim-ethyl-oxy-biphenylene-4,4'-; 3,3'-diphenylbiphenylene-4, 4'-; naphthalene-1,5- and tetrahydronaphthalene-I,5-diisocyanates and triphenylmethane tri-isocyanate; alkylene polyisocyanates such as ethylene, ethylidene; propylene-1, 2-; butylene-1,4-; butylene-1,3-; hexylene-1,6-; decamethylene-1,10; cyclohexylene-1,2; cyclohexylene-1,4-; and. methylene-bis-(cyclohexyl-4,4'-) diisocyanates.

It is generally preferred to use commercially readily available polyisocyanates, e.g., tolylene-2,4- and -2,6-diisocyanate and any mixtures of these isomers, ("TDI"), polyphenyl-polymethylene-isocyanates obtained by aniline-formaldehyde condensation followed by phosgenation ("crude MDI"), PMDI and polyisocyanates which contain carbodiimide groups, urethane groups, allophanate groups, isocyanurate groups, urea groups, imide groups or biuret groups, ("modified polyisocyanates"). Inorganic polyisocyanates are also suitable according to the invention. Suitable polyisocyanates which may be used according to the invention are described, e.g., by W. Siefken in Justus Liebigs Annalen der Chemie, 562, pages 75 to 136.

Solutions of distillation residues accumulating during the production of tolylene diisocyanate, diphenyl methane diisocyanate or hexa-ethylene diisocyanate, in monomeric polyisocyanates or in organic solvents and mixtures thereof may be used in this process. Phosgenation products of condensates of aniline or anilines alkyl substituted on the nucleus, with aldehydes or ketones, may be used in this invention.

Organic polyhydroxyl compounds (polyols) and organic compounds with hydroxyl radicals may be used in this invention or first reacted with polyisocyanates or may be first reacted with a polyisocyanate to produce isocyanate-terminated polyurethane prepolymers and then also used in this invention.

Reaction products of from 50 to 99 mols of aromatic diisocyanates with from 1 to 50 mols of conventional organic compounds may be used.

The hydroxyl group containing polyesters may be used in this invention, for example, reaction products of polyhydric alcohols, preferably, dihydric alcohols, with the optional addition of trihydric alcohols, and polybasic, preferably dibasic carboxylic acid instead of free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: succinic acid, adipic acid, sebacic acid, suberic acid, azelaic acid, phthalic acid, phthalic acid anhydride, isophthalic acid, tetrahydro-phthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acids such as oleic acid, optionally mixed with monomeric fatty acids, dimethylterephthalate and bis-glycol terephthalate.

Any suitable polyhydric alcohol may be used such as, for example, ethylene glycol; propylene-1,2- and -1,3-glycol, butylene-1,4- and -2,3-glycol; hexane-I,6-diol; octane-I,8-diol; neopenthl glycol; cyclohexanedimethanol-(1A-bis-hy-droxymethylcyclo-hexane); 2 methyl propane-1,3-diol; glycerol; trimethylol propane; hexane-I,2,6-triol; butane-1,2,4 triol; trimethylolethane; pentaerythritol; quinitol; annitol and sorbitol; methylglycoside; diethylene glycol; tri-ethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as caprolactone, or hydroxycarboxylic acids such as co-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butyleneoxide, tetrahydrofuran, styrene oxide or epichlorohydrin, each with itself, e.g., in the presence of BF-' or by addition of these epoxides, optionally as mixtures or successively, to starting components which contain reactive hydrogen atoms such as alcohols or amines, e.g., water, ethylene glycol; propylene-1,3 or 1-2-glycol; trimethylolpropane; 4,4-dihydroxydiphenylpropane, aniline, ammonia, ethanolamine or ethylenediamine. Sucrose polyethers may also be used according to the invention.

It is frequently preferred to use polyethers which contain predominantly primary OH groups, (up to 90% by weight, based on the total OH groups contained in the polyether). Poly ethers modified with vinyl polymers such as those which may be obtained by polymerizing styrene or acrylonitrile in the presence of, polyethers, (U.S. Pat. Nos. 3,383,351; 3,304,273; 3,523,093 and 3,110,695; and German Patent No. 1,152,536) and polybutadienes which contain OH groups are also suitable. By "polythioethers" are meant, in particular, the condensation products of thiodiglycol with itself and/or with other glycols, di-carboxylic acids, formaldehyde, aminocarboxylic acids or amino alcohols. The products obtained are polythio-mixed ethers or polythio-ether ester amides, depending on the co-component. The polyacetals used may be, for example, the compounds which may be obtained from glycols, e.g., diethylene, triethylene glycol, 4,4-dihydroxydiphenylmethylmethane, hexanediol, and formaldehyde. polyacetals suitable for the invention may also be prepared by the polymerization of cyclic acetals.

The polycarbonates with hydroxyl groups used may be of the kind, e.g., which may be prepared by reacting diols, e.g., propane-1,3-diol; butane-I,4-diol; and/or hexane-I,6-diol or diethylene glycol; triethylene glycol or tetraethylene glycol, with diarylcarbonates, e.g., di-phenylcarbonates or phosgene.

The polyesteramides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups, modified or unmodified natural polyols, e.g., castor oil, carbohydrates and starches, may also be used. Additional products of alkylene oxides with phenol formaldehyde resins are also suitable for the purpose of the invention.

If the polyisocyanates or the prepolymer which contains NCO groups have a viscosity above 2000 cP at 25 C, it may be advantageous to reduce the viscosity thereof by mixing it with a low-viscosity organic polyisocyanate and/or an inert blowing agent or solvent. Inorganic polyisocyanates and isocyanate-terminated polyurethane silicate prepolymers may also be used in this invention.

When an aqueous solution of amino lignin or a mixture of amino lignin and amino lignin cellulose polymer is being used to react with, or as a curing agent for, polyisocyanates, it is advantageous in certain cases to use catalysts such as tertiary amines, e.g., triethylamine, tributylamine, N-methylmorpholine, N-ethyl-raorpholine, tetramethylenediamine, pentamethyldiethyleneamine, triethanolamine, triisoprophanolamine, organo-metallic compound, e.g., tin acetate, tin octoate, tin ethyl hexoate, dibutyl tin diacetate, di-butyl tin dilaurate and mixtures thereof in the amount of 0.1 to 10 parts by weight.

Other examples of catalysts which may be used according to the invention and details of their action are described in Kunststoff-Handbuch, Volume VII, published by Vieweg and Hochtlen, Carl-Hanser-Verlag, Munich, 1966, e.g., on pages 96 and 102. Sila-amines are suitable catalysts, e.g., 2, 2-4-trimethyl-2-silamorpholine or 1,3-diethyl aminomethyl tetramethyl disiloxane. Suitable catalysts are also tetraalkyl ammonium hydroxides, alkali phenolates, alkali metal hydroxides, alkali phenolates, alkali-alcoholates and hexahydrotriazines.

Suitable flame-resistant compounds may be used which contain halogen or phosphorus, e.g., tributylphosphate; tris (2,3-dichloropropyl)-phosphate; polyoxypropylenechloromethylphosphonate; cresyldiphenyl-phosphate; tricresylphosphate; tris-(beta-chloroethyl)-phosphate; tris-(2,3-dichloropropyl)-phosphate; triphenyl-phosphate; ammonium phosphate; perchlorinated diphenyl; perchlorinated terephenyl; hexabromo-cyclodecane; tribromophenol; dibromopropyldiene; hexabromobenzene; octabromodiphenylether; pentabromotoluol; poly-tribromostyrol; tris-(bromocresyl)-phosphate; tetrabromobis-phenol A: tetrabromophthalic acid anhydride; octabromodiphenyl; tri-(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well, amino phosphorus compounds, as further phosphorus and/or halogen-containing flame-resistant compounds as they are described, e.g., in "Kunststoff-Handbuch", Volume VII, Munich 1966, pages 110-111, which is incorporated herein by reference. The organic halogen-containing components Eire, however, preferred in the polyurethane-cellulose and polyurethane-cellulose-silicate cellular solid products. In the production of amino lignin aldehyde, amino lignin cellulose aldehyde and phenol-amino lignin aldehyde and amino lignin cellulose cellular solid products, phosphoric acid may be used to react with the amino atoms, thereby producing an amino hydrogen phosphate which may be used as the flame-resistant compound. Alkali metal silicates may be used as flame-resistant compounds.

Any suitable water-binding agent may be used in this invention such as hydraulic cement, burnt lime, gypsum and synthetic anhydrites. Hydraulic cements such as Portland cement, quick-setting cement, mortar cement, blast-furnace Portland cement, sulphate-resistant cement, brick cement, mild-burnt cement, natural cement, lime cement, gypsum cement, calcium sulfate cement, pozzolan cement, etc., contain oxidated silicon compounds and may be used in this invention. There are many different kinds of cement which may be used; in general, any mixture of fine ground lime, alumina and silica that will set to a hard product by admixture of water which combines chemically with the other ingredients to form a hydrate may be used. The above suitable compound may be used as a mixture thereof.

An additional preferred process, about 0.5 to 5 parts by weight of an aldehyde are mixed and reacted with 1 part by weight of the mixture of amino lignin, lignin, amino cellulose and amino lignin cellulose resinous products, produced in this invention, the reaction may take place in an aqueous solution at a pH of 0.8 to 10 or a pH of 3 to 7, to produce poly(aldehyde amino lignin), poly(aldehyde amino cellulose), poly(aldehyde lignin) and poly(aldehyde amino lignin cellulose) resinous product.

In an additional preferred process, 0.5 to 5 parts by weight of an aldehyde, 1 to 5 parts by weight of an amino compound, and 4 parts by weight of the mixture of an amino lignin cellulose, amino cellulose, amino lignin, lignin, and lignin cellulose, produced by the process of this invention, are mixed and the resultant mixture is reacted, the reaction may take place in an aqueous solution with a pH of 8 to 10 or a pH of 3 to 7, thereby producing a poly(aldehyde-amino lignin cellulose amino lignin amino cellulose) resinous product. When sawdust utilized as the lignin cellulose and in this method of delignification the products produced are reacted with formaldehyde in an aqueous medium with pH 8-10, a thermoplastic resin is produced then the remaining lignin cellulose and moist resin is mixed with a acidic compound and poured into a mold then cured by heat to form a water resistant and flame retardant particle board.

In an additional preferred process, 0.5 to 5 parts by weight of a phenol compound, 0.5 to 5 parts by weight of an aldehyde and 2 parts by weight of the amino lignin resinous product produced by the process of this invention are mixed and the resultant mixture is reacted, the reaction may take place in an aqueous solution with a pH of 8 to 12 or a pH of 3 to 7, thereby producing a poly(aldehyde-phenol-amino lignin) resinous product.

In an additional preferred process, 0.5 to 5 parts by weight of at least one thermosetting resin of the class consisting of the thermosetting urea formaldehyde resins and melamine-formaldehyde resins, 2 parts by weight of the amino lignin resinous product produced in this invention and 5 parts by weight of silica are mixed then reacted under, heat (220 to 300 F) and pressure (150 to 250 psi) for 1 to 10 minutes thereby producing an aminoplast amino lignin silicate resinous product.

In an additional preferred process, 0.5 to 5 parts by weight of a thermosetting phenol-aldehyde resin selected from the group consisting of phenol-formaldehyde resin, phenol-resorcinol-formaldehyde resin, resorcinol-formaldehyde resin and mixtures thereof and 2 parts by weight of amino lignin resinous product as produced in this invention are mixed and reacted by heat (220 F to 300 F) and pressure (150 to 250 psi) for 1 to 10 minutes thereby producing a phenolast amino lignin resinous product. Paraformaldehyde may also be added with the thermosetting phenol-aldehyde resin in an amount of 0.5 to 3 parts by weight.

In an additional preferred process, 0.5 to 5 parts by weight of an aldehyde, 1 to 5 parts by weight of an amino compound, 1 to 5 parts by weight of a phenol compound and two parts by weight of the amino lignin resinous product, produced by the process of this invention, are mixed; the resultant mixture is reacted, the reaction may take place in an aqueous solution with a pH of 8 to 12 or a pH of 3 to 7, thereby producing a phenoplast amino lignin aminoplast resinous product.

In an additional preferred process, 2 parts by weight of the mixture of amino lignin, amino cellulose and amino lignin cellulose resinous product, produced by the process of this invention, and 1 to 4 parts by weight of an organic polyisocyanate are mixed, then agitated for 10 to 60 minutes at a temperature between 20 C to 70° C., thereby producing a poly(polyisocyanate amino lignin amino cellulose amino lignin cellulose) prepolymer; then 10% to 100% by weight of a curing agent, based on the weight of the prepolymer, is added to the poly(polyisocyanate amino lignin amino cellulose amino lignin cellulose) prepolymer while agitating at 20 C to 80 C for 5 to 20 minutes, thereby producing a cellular solid or solid poly(polyisocyanate amino lignin amino cellulose amino lignin cellulose) product.

In an additional preferred process, 1 to 3 parts by weight of the amino lignin, amino cellulose and amino lignin cellulose mixture, as produced by the process of this invention, 1 to 3 parts by weight of a polyol, 1 to 10 parts by weight of a water-binding agent, 1 to 10 parts by weight of a filler, 1 to 3 parts by weight of an organic polyisocyanate, up to 10% by weight of a filler, 1 to 3 parts by weight of an organic polyisocyanate, up to 10% by weight of an amine catalyst and up to 50% by weight of an inert volatile blowing agent, percentage based on the weight of the reactants (amino lignin, amino cellulose and amino lignin-cellulose, polyol and polyisocyanate) are mixed and the resultant mixture is reacted thereby producing a polyurethane amino lignin amino cellulose amino lignin cellulose foamed product; the foamed product is then emerged in water for 1 to 3 hours thereby curing the water-binding agent.

In an additional preferred process, 1 to 3 parts by weight of the amino lignin product, as a product of this invention, 1 to 3 parts by weight of a polyol, 1 to 3 parts by weight of an alkali metal silicate such as sodium and potassium silicate, up to 5% by weight of an emulsifying agent and up to 10% by weight of an amine catalyst are mixed to form an emulsion then mixed with a mixture of 3 parts by weight of PMDI thereby producing a poly(urethane amino lignin alkali metal silicate) foam.

In an additional preferred process, 1 to 3 parts by weight of the mixture of amino lignin, amino lignin-cellulose, amino cellulose, lignin, lignin cellulose and sugars as produced in the process of this invention, 3 parts by weight of an isocyanate-terminated poly-urethane prepolymer, up to 10% by weight of amine catalyst, up to 20% by weight of a foam stabilizer, up to 50% by weight of an inert volatile blowing agent, up to 100% by weight of a curing agent and up to 3 parts by weight of a polyol are mixed; the resultant mixture is allowed to react thereby producing a polyurethane rigid foam.

In an additional preferred process, 1 to 3 parts by weight of the amino lignin, amino lignin-cellulose, lignin, lignin cellulose and amino cellulose mixture as produced by the process of this invention and 1 to 3 parts by weight of furfuryl alcohol are mixed, then an acid compound is added until the pH is 2 to 6, as tested in water, is thoroughly mixed and the resultant mixture allowed to react thereby producing a poly(furfuryl alcohol amino lignin amino cellulose amino lignin cellulose) resinous product.

Readily volatile blowing agents, e.g., dichlorodifluoromethane in the amount of 10 to 50 parts by weight, such as trichlorofluoromethane, butane, isobutylene or vinyl chloride, may be used to produce cellular solid products in this invention. In addition, the liquid reaction mixtures can be expanded into a foam by the introduction of gases, optionally under pressure, such as air, methane, CF, noble gases and carbon dioxide, the resulting foam being introduced into the required mold and hardened therein. The resultant foam may optionally contain foam stabilizers such as surfactants, foam formers, emulsifiers and, if desired, other organic or inorganic fillers or diluents may initially be converted by blowing gas into a foam and the resulting foam subsequently mixed in a mixer with the other components, the resulting mixture being allowed to harden. Instead of blowing agents, it is also possible to use inorganic or organic, finely divided hollow bodies such as expanded hollow beads of glass, plastic, straw, expanded day, and the like, for producing foams. The foams obtainable in this way can be used either in their dry or their moist form if desired after a compacting or tempering process, optionally carried out under pressure, as insulating materials, cavity fillings, packaging materials, building materials, etc. They can also be used in the form of sandwich elements, for example, with metal covering layers, in house, vehicle and aircraft construction. It is also possible to introduce into the foaming reaction mixtures, providing they are still free-flowing, organic and/or organic foamable or already foamed particles, for example, expanded day, expanded glass, wood, popcorn, cork, hollow beads of plastics, for example, vinyl chloride polymers, polyethylene, styrene polymers or foam particles thereof or even, for example, polysulphone, polyepoxide, polyurethane, urea formaldehyde, phenol formaldehyde, polyimide polymers, urea silicate formaldehyde polymers, phenol silicate formaldehyde, epoxy silicate polymers, polyisocyanate silicate polymers, polyurethane silicate polymers or the reaction mixture may be allowed to foam through interstitial spaced particles in packed volumes of these particles and, in this way, to produce insulating materials. Combinations of expanded clay, glass or slate with the reaction mixture, according to the invention, are especially preferred.

It is also possible to introduce into the foaming reaction mixtures, providing they are still free-flowing, at a pre-determined temperature, a blowing agent which is capable of evaporation or of gas formation at these temperatures, for example, a halogenated hydrocarbon. The liquid mixture formed can be used not only for producing uniform foams or nonuniform foams containing foamed or unfoamed fillers, but it can also be used to foam through any given webs, woven fabrics, lattices, structural elements or other permeable structures of foamed materials, resulting in the formation of composite foams with special properties, for example, favorable flame behavior, which may optionally be directly used as structural elements in the building, furniture or vehicle and aircraft industries.

The cellular solid products (foams) according to the invention can be added to soil in the form of crumbs, optionally in admixtures with fertilizers and plant-protection agents, in order to improve its agrarian consistency. Since the hardened foams obtained by the process according to the invention can show considerable porosity after drying, they are suitable for use as drying agents because they can absorb water; however, they can also be charged with active substances or used as catalyst supports or filters and absorbents. On the other hand, the foams can be subsequently lacquered, metallized, coated, laminated, galvanized, subjected to vapor deposition, bonded or flocked in either their moist or dry form or in impregnated form. The moldings can be further processed in their moist or dried form, for example, by sawing, milling, drilling, planing, polishing and other machining techniques. The optionally filled molding can be further modified in their properties by the-treatment, oxidation processes, hot-pressing, sintering processes or surface melting or other consolidation processes. Suitable mold materials include inorganic and/or organic foamed or unfoamed materials such as metals, for example, iron, nickel, fine steel, la-coated aluminum, porcelain, glass, wood, plastics such as PVC, polyethylene, epoxide resins, ABS, polycarbonate, etc.

Fillers in the form of particulate or powdered materials can be additionally incorporated into the liquid mixtures of the foamable or resinous reactants for a number of applications.

Suitable fillers include solid inorganic or organic substances, for example, in the form of powders, granulate, wire, fibers, dumb bells, crystallites, spirals, rods, beads, hollow beads, foam particles, webs, pieces of woven fabric, knit fabrics, ribbons, pieces of film, etc., for example, of dolomite, chalk, alumina, asbestos, basic silicas, sand, talcum, iron oxide, aluminum oxide and oxide hydrate, zeolites, calcium silicates, basalt wool or powder, glass fibers, C-fibers, graphite, carbon black, Al-, Fe-, Cu-, Ag-powder, molybdenum sulphite, steel wool, bronze or copper cloth, silicon powder, expanded clay, polybutadiene, polyisoprene, polytetrafluoroethylene, aliphatic and aromatic polyesters, melamine-urea or phenol resins, polyacetal resins, polyepoxides, polyhydantoins, poly urea, polyethers, polyurethanes, polyimides, polysulphones, polycarbonates, and, of course, any copolymers as well. Inorganic fillers are preferred.

Generally, the composite materials according to the invention can be filled with considerable quantities of fillers without losing their valuable property spectrum. The amount of fillers can exceed the amount of the reactants. In special cases, the foamed products of the present invention act as a binder for such fillers. 10 to 200 parts by weight of a filler may be add.

Basically, the production of the cellular solid products according to the invention is carried out by mixing the reactants in one or more stages in a continuously- or intermittently-operated mixing apparatus and then allowing the resulting mixture to foam and solidify, usually outside the mixing apparatus in molds, or on suitable materials. The reaction temperature required for this, which may be from 0 C to 200 C and preferably from 200 C to 160 C, may either be achieved by heating one or more of the reactants before the mixing process or by heating the mixing apparatus itself or, alternatively, by heating the reaction mixture after the components have been mixed. Combinations of these or other methods of adjusting the reaction temperature may, of course, also be employed. In most cases, sufficient heat is evolved during the reaction to enable the reaction temperature to rise to values above 50 C after the reaction or foaming has begun.

In particular, however, the process according to the invention is suitable for in situ foaming on the building site. Any hollow forms obtained by means of shuttering in the conventional way may be filled up and used for foaming in this way.

The amino lignin, amino cellulose, lignin and amino lignin cellulose resinous product as produced in this invention may be pre-reacted with an aldehyde, at a pH of 7 to 12, to produce a liquid of amino lignin aldehyde, then placed in a mixing chamber, optionally adding a blowing agent, emulsifier, foam stabilizer, filler, flame-retardant and other additives, then rapidly mixed with an acid compound and then pumped or blown by compressed air into a mold such as a wall. ceiling, etc., while expanding, thereby producing a cellular solid product, useful for sound and thermal insulation. The foaming components may also be pumped into a large mold to expand and harden into a cellular product. The cellular product may be sawed, drilled, planed or nailed. The foaming components may be foamed up and hardened while the form of droplets or may be dispersed, e.g" in petroleum hydrocarbons or while they are under condition of free fall. Foam beads are obtained in this way. The foamed products produced by these methods may also be added in a crumbly form to protective agents so as to improve the agricultural consistency of the soil. Foams which have a high water content may be used as substrates for the propagation of seedlings, shoots and plants or for cut flowers. The mixtures may be sprayed on terrain which is impassible or too loose, such as dunes or marshes, to strengthen such terrain so that it will be firm enough to walk on within a short time, and will be protected against erosion. The foaming mixtures may also be used underground in caves, mines, tunnels, etc., by spraying the foaming mixture onto wire mesh, fiberglass cloth, woven fabrics or directly on the walls, to produce protective layers to prevent accidents. It is also possible to introduce into the roaming reaction mixtures, providing they" are still free-flowing, organic and/or organic foamable or already foamed particles such as expanded clay, expanded glass, wood, popcorn, cork, hollow beads of plastics, for example, vinyl chloride polymers, polyethylene, styrene polymers or foam particles thereof or even, for example, polysulphone, polyepoxide, polyurethane, urea formaldehyde phenol formaldehyde, polyimide polymers, or to allow the reaction mixtures to foam through interstitial space in packed volumes of these particles, and in this way to produce insulating materials which are distinguished by excellent flame behavior. Combinations of expanded clay, glass, or slate with the reaction mixtures, according to the invention, are especially preferred.

The urea lignin-cellulose resinous and urea lignin product, poly(aldehyde urea lignin-cellulose) resinous product, poly (urea lignin aminoplast amino lignin cellulose) resinous product, poly(amino lignin phenoplast amino lignin cellulose) and poly(amino lignin aminoplast amino lignin cellulose phenoplast) resinous produced may use as a thermosetting resinous adhesive useful particularly as plywood, ABS, for lumber laminating adhesive, etc. The adhesive may be cured by heat (250 C to 300 C) and pressure (110 to 260 psi). The adhesive resinous products will also cure by the presence of an alkali or acetic catalyst or by using hexamethylene or paraformaldehyde.

These poly(polyisocyanate amino lignin cellulose), polyurethane amino lignin cellulose, polyurethane amino lignin, polyurethane amino cellulose, polyurethane lignin-cellulose silicate and poly(polyisocyanate amino lignin cellulose silicate) cellular products are soluble in organic solvents and may be utilized as paints, varnishes, adhesives, fillers, caulking material, etc.

DETAILED DESCRIPTION OF THE INVENTION

Lignin is a complex hydrophobic network of phenylpropanoid units which varies in its subunit composition and intermolecular linkage. These complex phenolic are thought to include 4-hydroxycinnamyl alcohol, coniferyl alcohol and sinapyl alcohol. In different plants the lignin vary in composition. Most lignin contain phenyl type hydroxyl radicals, acid radicals, unsaturated radicals and epoxy radicals and other radicals when the lignin is separated from the cellulose. The phenyl type hydroxyl radicals are reacted with the —$NH_2$ on the amino compound and separates from the cellulose to produce an amino lignin. Some of the amino compounds react with the lignin which is still attached to the cellulose and with cellulose. The amino phenyl type hydroxyl compounds, amino cellulose, amino lignin cellulose and the phenyl type hydroxy compounds on the lignin cellulose are chemically active and will react with aldehydes, organic acids, inorganic acids, ketones, amines, polyamines, amino compounds, epoxy compounds, polyepoxy, polysulfone, polyimines, phenoplasts, aminoplasts, polyesters, polyethers and polythioethers containing —OH radicles, vegetable oils, fats, carbohydrates, soy flour, proteins, starch, wheat flours, cellulose, alcohols, polycarboxylic acids, polyalcohols, polyisocyanates, polycarbonates with —OH radicles, epichlorohydrin, substituted compounds, furfurol, furfuryl alcohol, organic and inorganic phosphorus compounds, some unsaturated organic compounds, alkali metal compounds, alkali metal earth compounds and other compounds.

In general, the lignin cellulose bond is broken by soaking in an aqueous solution of the listed amino compounds with urea, preferable urea and or guanidine type compounds, at ambient temperature for 12 to 24 hours or by heating the biomass containing lignin cellulose plant particles in an aqueous solution of listed amino compounds at ambient pressure at 100 degree C. for 1-4 hours or at 150 degree C. under pressure for 0.5 to 4 hours thereby breaking the lignin cellulose bond by the process of the amino compounds reacts with the lignin to form amino lignin and the amino compound react with some of the lignin still attached to the cellulose and cellulose producing amino-lignin-cellulose, amino cellulose and some of the phenyl hydroxyl radical on the lignin cellulose are also chemically active. The amino lignin is water soluble and form an aqueous solution of amino lignin. The aqueous amino lignin, lignin, carbohydrates, hemi-cellulose solution are removed from the amino lignin cellulose, lignin cellulose and amino cellulose by compression, filtration or any suitable means. Water is removed from the aqueous amino salt of lignin solution until a thick solution is formed or further dried until granules are formed. The urea lignin may be utilized to produce amino lignin aldehyde resins or may be reacted with epoxy compounds, furfurol, furfuryl alcohol or polycarboxyl acids and other listed compounds to produce resins and adhesives. The amino-lignin-cellulose, amino cellulose and lignin cellulose has many uses such as paper production, hydrolyzed to carbohydrates, in production of fiberboard, plywood, molded objects, fertilizer, animal feed and other uses.

The amino of lignin, hemi-cellulose, carbohydrates, amino lignin cellulose, amino cellulose and lignin cellulose mixture with most of the water evaporated off is mixed with and aldehyde such as aqueous formaldehyde, pH adjusted to 7-8 with a basic compound such as ammonia then heated until the water is evaporated off, then a acidic compound such as urea sulfate is added until the pH 4-6 is obtained then further heating the mixture to about 100-250 degree C. at ambient to elevated pressure to effect polymerization to form a hard, strong, water resistant, fire resistant, thermosetting material. A basic catalyst may be added to the amino lignin, amino cellulose and amino lignin cellulose mixture until the pH is about 8, then aqueous formaldehyde is added, then heated until the water is evaporated to form a thermoplastic resin. An acid catalyst is added to the mixture until the pH is about 4-5 then further heated until the it solidifies to form a hard, strong, water resistant, fire resistant, thermosetting material.

The hemi-cellulose, amino lignin cellulose, amino cellulose and modified lignin cellulose produced by this invention are hydrolyzed to carbohydrates by acid hydrolysis using 70% sulfuric acid or 40% hydrochloric acid. The concentrated acid is add to the dried amino-lignin-cellulose in the ratio of 1-2 parts by weight of acid to 1 part weight of the amino-lignin-cellulose then heated to a low temperature of 50-70 degree C. for 1-6 hours to produce a mixture of carbohydrates, amino salt of the acid, lignin cellulose and cellulose. The cellulose and lignin cellulose that was not hydrolyzed is separated by pressing and filtering then retreated by reacting the lignin with an amino compound in an aqueous solution to produce a water soluble amino salt of lignin which is removed from the cellulose by pressing and filtering. The cellulose is then dried and retreated with the acid. The aqueous solution of carbohydrates and sulfuric acid are treated to separate the carbohydrates from the sulfuric acid by via ion exchange and then the sulfuric acid is re-concentrated via multiple effect evaporators. When hydrochloric acid is utilized the remaining solid cellulose and lignin cellulose are removed from the aqueous solution of carbohydrates and amino chloride by pressing and filtering then retreated. The carbohydrates and amino chloride is recovered by evaporating the aqueous hydrochloric acid under vacuum to depress the boiling point. The acid left in the carbohydrate and amino chloride is naturalized with calcium hydroxide. The carbohydrate may be converted into alcohol by yeast or any other suitable mean A dilute acid hydrolysis process using sulfuric or hydrochloric acid may be utilized to hydrolyze the amino-lignin-cellulose into carbohydrates. The amino-lignin-cellulose is soaked in 30-40% sulfuric or hydrochloric acid for 1-4 hours then water is evaporated until the acid is more concentrated up to 40 to 70% then further reacted for 1-4 hours. The carbohydrates, acid and amino salt is filter by pressing or filtering and the cellulose and lignin cellulose residue is retreated.

The object of the present invention is to provide a novel process for delignification of lignin cellulose and produce amino lignin, amino cellulose, amino lignin cellulose resinous products, cellulose, sugars, hemi-cellulose, carbohydrates and waxes, turpentine, alcohols, agar, reins, rubber latex, dyes, etc. from lignin cellulose containing plants. Another object is to produce novel amino lignin, lignin, amino lignin-cellulose, lignin cellulose products which are highly chemically reactive. Still another object is to product carbohydrates (sugars) which can be fermented to produce ethanol. Another object is to react products produced by the delignification of lignin cellulose by an aqueous urea to react with an aldehyde to produce a resinous product which is cured by heat and/or an acidic compound to produce a flame retardant, water resistant, hard, tough resinous product. Still another object is to produce amino lignin, amino lignin cellulose and amino cellulose resinous product which will react chemically with aldehydes to produce novel poly(aldehyde amino lignin), poly(amino lignin cellulose) and poly(aldehyde amino cellulose) resinous product and foams. Another object is to produce novel amino lignin, amino lignin cellulose, amino cellulose polymers that will react with aldehydes and amino compounds to produce novel poly(aminoplast amino lignin), poly(aminoplast amino lignin cellulose), poly(aminoplast cellulose) resins and foams. Another object is to produce amino lignin, amino cellulose, lignin cellulose and amino lignin cellulose polymers that will react with aldehyde compounds and phenol compounds to produce novel poly(phenoplast amino lignin), poly(phenoplast amino lignin cellulose) and poly(phenoplast amino cellulose) resins and foams. Another object is to produce amino lignin, amino lignin cellulose, amino cellulose, carbohydrates, lignin and lignin cellulose polymers that will react with polyisocyanate compounds and polyurethane prepolymers to produce novel poly(polyisocyanate amino lignin), poly(polyisocyanate amino lignin cellulose), poly(polyisocyanate amino cellulose) and poly(urethane lignin cellulose) resins and cellular products. Another object is to produce amino lignin, amino lignin cellulose, lignin, amino cellulose, lignin cellulose polymers that will react with polyurethane prepolymers and oxidated silicon compounds to produce novel poly(urethane amino lignin cellulose silicate) resins and cellular solid products. Another object is to produce amino lignin, amino lignin cellulose, amino cellulose, lignin and lignin cellulose that will react with reactive organic compounds to produce polymers, resins and adhesive. Another object is to chemically react the amino lignin, amino cellulose, lignin, amino lignin cellulose and lignin cellulose compounds and resinous products of this invention with other organic chemicals which contain one or more hydroxyl, aldehyde, acetic, epoxy, anhydride, ether, amino, amine, ketone, unsaturated, substituted, isocyanate, phosphorus and other radicals. Another object is to react the amino lignin with bio-based compounds such as vegetable oils and proteins, sugars, flours, lignin, cellulose and hemi-cellulose. Another object is to react the amino lignin, lignin, amino cellulose, amino lignin cellulose with alkali metal compounds.

The foamed products produced by these methods may also be added in a crumbly form to soil, optionally with the addition of fertilizers and plant-protective agents so as to improve the agricultural consistency of the soil. Foams which have a high water content may be used as substrates for the propagation of seedlings, shoots and plants or for cut flowers. The mixtures may be sprayed on terrain which is impassible or too loose, such as dunes or marshes, to strengthen such terrain so that it will be firm enough to walk on within a short time, and will be protected against erosion. The foaming mixtures may also be used underground in caves, mines, tunnels, etc., by spraying the foaming mixture onto wire mesh, fiberglass cloth, woven fabrics or directly on the walls, to produce protective layers to prevent accident. It is also possible to introduce into the roaming reaction mixtures, providing they are still free-flowing, organic and/or organic foamable or already foamed particles such as expanded clay, expanded glass, wood, popcorn, cork, hollow beads of plastics, for example, vinyl chloride polymers, polyethylene, styrene polymers or foam particles thereof or even, for example, polysulphone, polyepoxide, polyurethane, urea formaldehyde phenol formaldehyde, polyimide polymers, or to allow the reaction mixtures to foam through interstitial space in packed volumes of these particles, and in this way to produce insulating materials which are distinguished by excellent flame behavior. Combinations of expanded clay, glass, or slate with the reaction mixtures, according to the invention are especially preferred.

The amino lignin, amino cellulose and amino lignin cellulose resinous product, poly(aldehyde amino lignin amino cellulose) resinous product, poly(aminoplast amino lignin amino lignin cellulose) resinous product, poly(phenoplast amino lignin amino lignin cellulose) and poly(aminoplast amino lignin amino cellulose phenoplast) resinous produced may be used as a thermosetting resinous adhesive useful particularly as an adhesive for plywood and laminating lumbar. The adhesive may be cured by heat (250 C to 400 C) and pressure (110 to 260 psi). The adhesive resinous products will also cure by the presence of an alkali or acetic catalyst or by using hexamethylene or paraformaldehyde.

These poly(polyisocyanate amino lignin cellulose), polyurethane amino lignin, polyurethane amino cellulose, polyurethane cellulose, polyurethane amino lignin cellulose silicate and poly(polyisocyanate amino lignin cellulose silicate) cellular products are soluble in organic solvents and may be utilized as paints, varnishes, adhesives, fillers, caulking material, etc.

DESCRIPTION OF PREFERRED EMBODIMENTS

My invention will be illustrated in detail by the specific examples which follow, it being understood that these preferred embodiments are illustrative of, but not limited to, procedures which may be used in the production of amino lignin, amino cellulose, amino lignin cellulose adhesive and resinous product and carbohydrates.

The following examples illustrate the invention. Unless otherwise designated, all constituents are designated on the basis of parts by weight.

Example 1

80 parts by weight of fir sawdust and 30 parts by weight of urea were added to 250 parts by weight of water then the mixture was heated to the boiling point of water at ambient pressure for 1 hour. The water had a brown color after 5 minutes of heating. A mixture of urea lignin and urea lignin cellulose along with urea cellulose, lignin, hemi-cellulose, carbohydrates, waxes, alcohol, and other products are produced. The aqueous mixture was pressed and filtered from the urea lignin cellulose, amino cellulose and lignin cellulose then the urea lignin cellulose, urea cellulose and lignin cellulose was re-washed with water, pressed and filtered to remove more water soluble compounds. The urea lignin cellulose, urea cellulose and lignin cellulose are dried, weighed and has lost 25% of the fir original weight. The dark brown aqueous solution is evaporated by heating to a thick solution or is further dried to granules which weighed 32 parts by weight.

The above urea lignin cellulose, urea cellulose and lignin cellulose was re-treated by adding 30 parts by weight of urea and 250 parts by weight of water then boiling for 1 hour. The aqueous solution of urea lignin, lignin, hemi-cellulose and carbohydrates were filtered off then the urea lignin cellulose, amino cellulose and lignin cellulose was washed then pressed and filtered, the urea lignin and other compound such hemi-cellulose, carbohydrates was filtered off. The dark brown aqueous solution was evaporated and 30 parts by weight of dark brown dry granules was obtained.

Example 2

Example 1 is modified where in a different amount and type of amino compound is utilized in place of the urea and selected from the list below:

| | |
|---|---|
| a. 20 parts by weight of urea | b. 40 parts by weight of urea |
| c. 50 parts by weight of urea | d. 60 parts by weight of urea |
| e. 80 parts by weight of urea | f. 30 parts by weight of guanidine |
| g. 20 parts by weight with 20 parts by weight of urea | |
| h. 20 parts by weight of urea with 10 parts by weight of melamine | |
| i. 25 parts by weight of urea 15 parts by weight of guanidine carbonate | |
| j. 30 parts by weight of urea with sufficient ammonia to adjust pH to 7.5 | |
| k. 30 parts by weight of urea cyanurate | l. 20 parts by weight of urea polyamine condensate |

Example 3

Example 1 is modified wherein another ground up lignin cellulose plant is used in place of fir sawdust and selected from the list below:
spruce, pine, hemlock, oak, ash, larch, birch, aspen, poplar, cedar, beech, maple, walnut, cypress, redwood, cherry, elm, chestnut, hickory, locust, sycamore, tulip, tupelo, butternut, apple, alder, magnolia, dogwood, catalpa, boxwood, crabwood, mahogany, greenheart, lancewood, letterwood, mora, prima vera, purpleheart, rose.-wood, teak, satinwood, mangrove, wattle, orange, lemon, logwood, fustic, osage orange, sappanwood, Brazilwood, barwood, camwood, sandalwood, rubber, gutta, mesquite, and shrubs, e.g., oleander, cypress, junipers, acanthus, pyracantha, ligustrum, la tana, bougainvillea, azalea, feijoa, ilex, fuscia, hibiscus, datura, holly, hydrangea, jasmine, eucalyptus, cottoneaster, xylosma, rhodeodendron, castor bean, eugenia, euonymus, fatshedera, aralia, etc., and agricultural plants, e.g., cotton, cotton stalks, corn stalks, corn cobs, wheat straw, oat straw, rice straw, cane sugar (bagasse), soybean stalks, peanut plants, pea vines, sugar beet waste, sorghum stalks" tobacco stalks, maize stalks, barley straw, buckwheat straw, quinoa stalks, cassaya, potato plants, legume vines and stalks, vegetable inedible portion, etc., weeds, grasses, vines, kelp, flowers, algae, paper, cotton cloth, bagasse wallboard, wood products, humus, peat, certain soft brown coal and mixtures thereof.

Example 4

90 parts by weight of the mixture of urea lignin, urea lignin cellulose, lignin cellulose, urea cellulose, hemi-cellulose and carbohydrates in an aqueous solution produced in Example 1 are mixed with an aqueous solution of formaldehyde (37%) in the ratio 2 moles of formaldehyde to 1 mol of the urea, and aqueous ammonia is added until a pH of 7.5 is obtained. The mixture is heated until all of the free water is evaporated, then ammonium sulfate powder is added to produce an acidic pH 5 when heated, then the resins are compressed in a mold and heated to cure the resin, evaporate the rest of the water and produce a water resistant, fire resistant, hard and strong particle board.

Example 5

Urea in the amount of 40 parts by weight is added with 40 parts by weight of spruce sawdust into water then boiled for 30 minutes thereby producing partial delignification of the sawdust to produce urea lignin, lignin, urea lignin cellulose, lignin cellulose, urea cellulose, carbohydrates and other products. 70 parts by weigh of aqueous formaldehyde (37%) and aqueous ammonia added to the aqueous mixture until the pH 7.5 then heated until the free water is evaporated, then 5 parts by weight of acidic urea phosphate powder is add and mixed, then heated at 300 F. until the mixture becomes solid and then the remaining water is evaporated thereby producing a water resistant, fire resistant, hard and strong particle board.

Example 6

Example 5 is modified wherein another compound is added with the formaldehyde and selected from the group below:

| | |
|---|---|
| a. 10 parts by weight of soy flower | b. 10 parts by weight of melamine |
| c. 15 parts by weight of phenol | d. 10 parts by weigh of wheat flour |
| e. 10 parts by weight of biuret | f. 5 parts by of melamine phosphate |
| g. 10 parts by weight of dicyandiamide | h. 5 parts by weight of oat straw powder |
| i. 5 parts by weight of starch | j. dimelamine phosphate |

Example 7

10 parts by weight of dried urea lignin produced in example 1 and 30 parts by weight of aqueous formaldehyde (37%) are mixed then 5 parts by weight of soy flour is gradually added and mixed in. The mixture is then heated until the solution thickens to form an adhesive. The soy flour urea lignin formaldehyde resin is then cured by adding sufficient acidic urea phosphate to produce an acetic pH 5 in the mixture when the mixture is heated. It cures into a solid resinous product. This thick adhesive containing the curing agent may be applied to two pieces of boards then clamped and it will cure to form a strong glued joint.

Example 8

30 parts by weight of the moist dried mixture of urea lignin, lignin, urea lignin cellulose, lignin cellulose, urea cellulose and carbohydrate mixture produced in example 1 and 30 parts by weight of polymeric MDI are mixed and packed into a mold. The mixture cures in about an hour or can be cured faster using heat to form a water resistant, strong, solid particleboard or molded object.

Example 9

Example 8 is modified wherein the water soluble mixture of example 1 is filtered off and the non-water soluble portion containing 10 parts by weight of urea lignin cellulose, urea cellulose and lignin cellulose partially dried till only moist then mixed with the 10 parts by weight of polymeric MDI. Thereby producing a solid urethane urea lignin cellulose resinous product.

Example 10

Example 8 is modified wherein a blowing agent, dichlorodifluoromethane, 2 parts by weight, 0.5 parts by weight of silicone surfactant and 0.1 part by weight of amine catalyst, dimethylethanol-amino, is added to the mixture then molded thereby producing a rigid foam board when cured may be used as an insulating siding.

Example 11

An aqueous solution containing 40 parts by weight of urea and 40 parts by weight of pine sawdust is boiled for 2 hours. The solid urea lignin cellulose, urea cellulose and lignin cellulose are pressed and then the water soluble urea lignin, lignin, carbohydrates, hemi-cellulose, turpentine and other products are filtered off. The urea lignin are used to produce adhesives and resinous products. The urea lignin cellulose and lignin cellulose may be retreated with delignification agent such as urea to produce more urea lignin, lignin, urea cellulose, rosin, carbohydrates and the non-water soluble remaining urea lignin cellulose, lignin cellulose and urea cellulose may be used to produce paper, carbohydrates and alcohol.

20 parts by weight of the dried urea lignin produced above is mixed with 10 parts by weight of soy oil then heated while agitating up to the boiling point of the soy oil for 30 minutes to 2 hours or until the mixture solidifies when cooled thereby producing a urea lignin soy oil resinous product.

Example 12

Examples 4, 5, 6 and 7 are modified wherein another aldehyde is used in place of formaldehyde and selected from the list below or mixtures thereof:
acetaldehyde, butyl aldehyde, chloral, acrolein, furfural, benzaldehyde, crotonaldehyde, propionaldehyde, pentanals, hexanals, heptanals, octanals and there simple substitution products, semi-acetate and full acetals, paraformaldehyde and hexamethylene tetramine.

Example 13

30 parts by weight of the solid urea lignin cellulose, urea cellulose and lignin cellulose produced in example 1 are mixed in water containing 10 parts by weight of sodium hydroxide then heated until the water has evaporated, then 15 parts by weight of epichlorohydrin is added and mixed then heated to just below the boiling point of epichlorohydrin until a thick urea lignin cellulose epoxy compound is formed then 5 parts by weight of diethylenetriamine is added, mixed and reacted thereby producing a cured lignin cellulose epoxy resin.

Example 14

30 parts by weight of urea lignin in and aqueous solution produced in example 1 are mixed with 15 parts by weight of sodium hydroxide then heated till the water evaporate thereby producing a sodium salt of urea lignin which is then mixed with 10 parts by weight of epichlorohydrin. The mixture is heated to just below the boiling point of epichlorohydrin until a thick mixture is formed thereby producing an urea lignin epoxy compound which may be used as an adhesive or a resinous product.

Example 15

Examples 8, 9, 13 and 14 are modified wherein a filler in the amount of 10 parts by weight is added to the mixture before it is cured and selected from the list below and mixtures thereof:
in the form of powders, granulate, wire, fibers, dumb bells, crystallites, spirals, rods, beads, hollow beads, foam particles, webs, pieces of woven fabric, knit fabrics, ribbons, pieces of film, etc., for example, of dolomite, chalk, alumina, asbestos, basic silicas, sand, talcum, iron oxide, aluminum oxide and oxide hydrate, zeolites, calcium silicates, basalt wool or powder, glass fibers, C-fibers, graphite, carbon black, Al-, Fe-, Cu-, Ag-powder, molybdenum sulphite, steel wool, bronze or copper cloth, silicon powder, expanded clay pa-nitrile, polybutadiene, polyisoprene, polytetrafluoroethylene, aliphatic and aromatic polyesters, melamine-urea or phenol resins, polyacetal resins, polyepoxides, polyhydantoins, poly urea, polyethers, polyurethanes, polyimides, polyamides, polysulphones, polycarbonates, and copolymers.

Example 16

Example 11 is modified wherein another plant oil is used in place of the soy oil and selected from the list below or mixtures thereof:
modified soy oil, cotton seed oil, safflower oil, corn oil, palm oil, sun flower oil, canola oil, rapeseed oil, linseed oil, avocado oil, beach nut oil, copra oil, hemp oil, hazelnut oil, raspberry oil, coffee oil, cashew oil, elderberry oil and almonds oil.

Example 17

25 parts by weight of dry amino lignin powder produce in example 1 is mixed 10 parts by weight of succinic acid the heated to above the melting point of succinic acid for 0.5 to 3 hours thereby producing an amino lignin succinic polyester resin which may be used as an adhesive or a molding resin.

Example 18

Example 17 is modified where in a polycarboxylic acid or anhydride or mixture thereof and selected from the list below may be used in place of succinic acid for preparing amino lignin polyesters:
adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acids such as oleic acid, optionally mixed with monomeric fatty acids, dimethylterephthalate, bis-glycol terephthalate and mixture thereof and the amino compound is urea.

Example 19

About 25 parts by weight of glycerol and 50 parts by weight of dry amino lignin produced in example 11 are mixed then heated to just below the boiling point of glycerol for 1 to 4 hours thereby producing a amino lignin polyhydric resin which is then mixed with 70 parts by weight of polymeric MDI and reacted and poured into a mold thereby producing a polyurethane solid product.

Example 20

Example 19 is modified wherein another polyhydric compound is used in place of glycerol and selected from the list below:
ethylene glycol; propylene-1,2- and -1,3-glycol, butylene-1,4- and -2,3-glycol; hexane-I,6-diol; octane-I,8-diol; neopenthl glycol; cyclohexanedimethanol-(1A-bis-hydroxymethylcyclo-hexane); 2 methyl propane-1,3-diol; glycerol; trimethylol propane; hexane-I,2,6-triol; butane-1,2,4 triol; trimethylolethane; pentaerythritol; quinitol; annitol and sorbitol; methylglycoside; diethylene glycol; tri-ethylene glycol; tetraethylene glycol; polyethylene glycols; dipropylene glycol; polypropylene glycols; dibutylene glycol; polybutylene glycols; trimethylolpropane; 4,4-dihydroxydiphenylpropane, aniline, ammonia, ethanolamine or ethylenediamine, sucrose, starch, soy flour, castor oil, carbohydrates and mixtures thereof. The amino lignin is a urea lignin.

Example 21

25 parts by weight of the dry urea lignin produced in example 11 is mixed with 10 parts by weight of diethylenetriamine then heated up to the boiling point of diethylenetriamine for 1 to 4 hours thereby producing a diethylenetriamine urea lignin. One part by weight of the diethylenetriamine amino lignin is mixed and reacted with an epoxy resin thereby producing a solid epoxy resin.

Example 22

Another polyamine is used in place of diethylenetriamine in example 21 and selected from the group below;
ethyldiamine, tetraethylenepentamine, tetraethylenediamine, propyldiamine, triethylenetetramine, tetramethylenediamine, pentamethylenediamine, hexamethylenediamine, and mixtures thereof.

Example 23

25 parts by weight of the dry urea lignin produced in example 11 is mixed with 10 parts by weight of phenol then heated up to the boiling point of the phenol for 1 to 4 hours thereby producing a phenol amino lignin which may be utilized to react with an aldehyde to produce a poly(phenoplast amino lignin) resin or adhesive for producing plywood, OBS, particleboard, etc.

Example 24

Another phenol compound may be used in place of phenol in example 23 and selected from the group below;
phenol, p-cresol, o-cresol, m-cresol, cresylic acid, xylenols, resorcinol, cashew nut shell liquids, anacordol, p-tert-butyl phenol, Bisphenol A, creosote oil, 2,6 dimethylphenol and mixtures thereof. Phenol is the preferred phenol compound and formaldehyde is the preferred aldehyde when used with a phenol compound. Any suitable thermosetting phenol-formaldehyde and urea-formaldehyde resins may be used in this invention. Any suitable mixture of the amino compounds and phenol compounds with an aldehyde may be used in this invention.

Example 25

Example 7 is modified wherein another flour is used in place of soy flour and selected from the list below;
wheat flour, oat flour, cellulose flour, starch, corn meal, linen flour, barley flour and mixtures thereof.

Example 26

20 parts by weight of ground rice stalks and 15 parts by weight of urea was added to water then boiled for 1 hour then 60 parts by weight of aqueous formaldehyde (37%) and aqueous ammonia to adjust the pH 8-10 then boiled till all of the free water was evaporated there by producing a thermoplastic resin, then sufficient ammonia sulfate was added to adjust the pH 5-6 and then placed into a mold and heated to 300 degrees F. until the thermoplastic resin hardened into a thermosetting resin.

Example 27

Example 26 is modified wherein another lignin cellulose plant is used in place of ground rice stalks and the ground lignin cellulose is selected from the list below:
spruce, pine, hemlock, oak, ash, larch, birch, aspen, poplar, cedar, beech, maple, walnut, cypress, redwood, cherry, elm, chestnut, hickory, locust, sycamore, tulip, tupelo, butternut, apple, alder, magnolia, dogwood, catalpa, boxwood, crabwood, mahogany, greenheart, lancewood, letterwood, mora, prima vera, purpleheart, rose.-wood, teak, satinwood, mangrove, wattle, orange, lemon, logwood, fustic, osage orange, sappanwood, Brazilwood, barwood, camwood, sandalwood, rubber, gutta, mesquite, and shrubs, e.g., oleander, cypress, junipers, acanthus, pyracantha, ligustrum, la tana, bougainvillea, azalea, feijoa, ilex, fuscia, hibiscus, datum, holly, hydrangea, jasmine, eucalyptus, cottoneaster, xylosma, rhodeodendron, castor bean, eugenia, euonymus, fatshedera, aralia, etc., and agricultural plants, e.g., cotton, cotton stalks, corn stalks, corn cobs, wheat straw, oat straw, rice straw, cane sugar (bagasse), soybean stalks, peanut plants, pea vines, sugar beet waste, sorghum stalks" tobacco stalks, maize stalks, barley straw, buckwheat straw, quinoa stalks, cassaya, potato plants, legume vines and stalks, vegetable inedible portion, etc., weeds, grasses, vines, kelp, flowers, algae, paper, cotton cloth, bagasse wallboard, wood products, humus, peat, certain soft brown coal and mixtures thereof.

I claim:
1. A method for delignification of lignocellulose and reacting delignification compounds with a chemically active organic compound by the method comprising the steps of:
A) adding 50 to 100 parts by weight of lignocellulose particles;
B) adding 10 to 100 parts by weight of an amino compound selected from the group consisting of urea, guanidine, aminoguanidine, guanidine carbonate and urea mixed with other amino compounds and mixture thereof;
C) adding water to the lignocellulose particles and the amino compounds thus forming a mixture; then heating the mixture at ambient or elevated pressure, at ambient or up to 150 degrees C. for 0.5 to 24 hours thereby producing delignification compounds comprising amino lignin, amino lignin cellulose, amino cellulose, lignocellulose, lignin, carbohydrates, hemicellulose, resins, rosins and alcohols;

D) adding 25 to 100 parts by weight of chemically active organic compound to one or a mixture of the delignification compounds produced in step C then reacting the delignification compounds by mixing the delignification compounds of step C with the chemically active organic compound at ambient or elevated pressure and at ambient temperature up to the boiling point of the chemically active organic compound for 1 to 4 hours; wherein the chemically active organic compound is selected from the group consisting of propylene oxide, polyepoxy compounds, epichlorhydrin, and mixtures thereof; thereby producing adhesives and resins.

2. A method in accordance with claim 1 wherein the amino compound is a mixture of urea and an amino compound selected from the group consisting of thiourea, alkyl-substituted thiourea, alkyl substituted ureas, melamine, aniline, guanidine, aminoguanidine, melamine cyanurate, biuret, cyanuric acid, saccharin, urea condensates such as urea-cyandiamide, urea-aminoinoguanidine condensate, urea guanidine condensate, urea polyamine condensate, cyamelide, urea-melamine condensate, urea-dicyandiamide, urea cyanoguanidine condensate, urea cyanate condensates and aminophosphates with free $NH_2$, toluene sulfonamide, aliphatic and aromatic polyamines and mixtures thereof.

3. A method accordance with claim 1 wherein the delignification compounds produced in step C are filtered to separate water soluble compounds comprising amino lignin, lignin, carbohydrates, alcohols, rosins, and hemicellulose from non-water soluble solid compounds comprising amino lignin cellulose, cellulose and lignocellulose.

4. A method accordance with claim 1 wherein 50 to 100 parts by weight of the delignification compounds produced in step C comprising amino lignin, amino lignin cellulose, lignin, lignocellulose, carbohydrates, hemi-cellulose, resins, rosins and alcohol is mixed and reacted with 25 to 100 parts by weight of polyisocyanate thereby producing a solid resinous product.

5. A method accordance with claim 3 wherein the 50 to 100 parts by weight of moist water soluble mixture of amino lignin, lignin, carbohydrates, alcohols, rosins and hemi-cellulose is mixed and reacted with 25 to 100 parts by weight of PMDI (polymeric polyphenyl-polymethane-isocyanate) thereby producing a micro cellular foam product.

6. A method accordance with claim 4 wherein 10 to 50 parts by weight of a blowing agent, 0.1 to 5 parts by weight of a silicone surfactant and 0.1 to 10 parts by weight of a urethane catalyst is added to the mixture before foaming starts thereby producing a rigid polyurethane foam.

7. A method accordance with claim 1 wherein the aqueous mixture, produced in the delignification of lignocellulose, amino lignin, lignin, amino cellulose, amino lignin cellulose and lignocellulose are reacted with 25 to 100 parts by weight of an aldehyde by heating the mixture and evaporating the water and continue heating the mixture until it solidifies thereby producing a poly(aldehyde amino lignin amino lignin cellulose resinous product.

8. A method accordance with claim 7 wherein the aldehyde is formaldehyde.

9. A method accordance with claim 1 wherein the amino lignin in the amount of 50 to 100 parts by weight is chemically reacted with a chemically active compound in the amount of 25 to 100 parts by weight and selected from the group consisting of aldehydes.

10. A method according to claim 7 wherein the aldehyde is selected from the group consisting of formaldehyde, acetaldehyde, butyl aldehyde, chloral, acrolein, furfural, benzaldehyde, crotonaldehyde, propionaldehyde, pentanals, hexanals, heptanals, octanals and their simple substitution products, semi-acetate and full acetals, paraformaldehyde, hexamethylene tetramethylene and mixtures thereof.

11. A method according to claim 1 wherein 2-5 parts by weight of amino lignin produced by the delignification of step C is mixed with and reacted with 2 parts by weight of sodium hydroxide then 2 parts by weight of epichlorohydrin are added and mixed, the mixture is heated to just below the boiling point of epichlorohydrin for 1-2 hours and reacted thereby producing a amino liquid epoxy compound then add and mix 1 part by weight of an epoxy hardener consisting of a polyamine compound thereby producing a an amino lignin polyepoxy resinous product.

12. A method according to either claim 4 or claim 6 wherein the polyisocyanate is selected from the group consisting of tolylene-2,4- and -2,6-diisocyanate and any mixtures of these dimers, ("TDI"), polyphenyl-polymethylene-isocyanates obtained by aniline-formaldehyde condensation followed by phosgenation ("crude MDI"), polyphenyl-polymethylene-isocyanates (PMDI), polyisocyanates which contain carbodiimide groups, urethane groups, allophanate groups, isocyanurate groups, urea groups, imide groups or biuret groups, inorganic polyisocyanates, polyisocyanate prepolymers and mixtures thereof.

13. A method according to claim 1 wherein the amino lignin, amino lignin cellulose, amino cellulose and lignocellulose is added, mixed, and reacted a phenol compound and an aldehyde thereby producing a poly(phenoplast amino lignin cellulose) resin.

14. A method according to claim 13 wherein the phenol compound is selected from the group consisting of phenol, p-cresol, o-cresol, m-cresol, cresylic acid, xylenols, resorcinol, anacordol, p-tert-butyl phenol, Bisphenol A, creosote oil, 2,6 dimethylphenol and mixtures thereof and the aldehyde group is selected from the group consisting of fomaldehyde, acetaldehyde, butyl aldehyde, chloral, acrolein, furfural, benzaldehyde, crotonaldehyde, propionaldehyde, pentanals, hexanals, heptanals, octanals and there simple substitution products, semi-acetate and full acetals, paraformaldehyde, hexamethylene tetramethylene and mixtures thereof.

15. A method according to claim 1 wherein the amino lignin is added, mixed and reacted with a polycarboxylic acid selected from the group consisting of adipic acid, sebacic acid, suberic acid, azelaic acid, phthalic acid, phthalic acid anhydride, isophthalic acid, tetrahydro-phthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acids and mixture thereof.

16. A method according to claim 1 wherein the amino lignin, amino lignin cellulose, amino cellulose and lignocellulose is added, mixed and reacted with an furfuryl alcohol thereby producing poly(furfuryl alcohol amino lignin amino lignin cellulose) resin.

* * * * *